United States Patent
Huang et al.

(10) Patent No.: US 6,595,481 B1
(45) Date of Patent: Jul. 22, 2003

(54) LIQUID CRYSTAL DISPLAY AND ITS ROTARY ASSEMBLY

(75) Inventors: Sheng Hao Huang, Chungli (TW); Chien Ju Hung, Taoyuan (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 10/241,058

(22) Filed: Sep. 10, 2002

(30) Foreign Application Priority Data

Feb. 1, 2002 (TW) ........................................ 91201172 U

(51) Int. Cl.⁷ .............................................. A47B 91/00
(52) U.S. Cl. ................. 248/349.1; 248/278.1; 248/923
(58) Field of Search ............................. 248/349.1, 921, 248/922, 923, 371, 278.1; 403/113

(56) References Cited

U.S. PATENT DOCUMENTS

| | | | | |
|---|---|---|---|---|
| 4,547,027 A | * | 10/1985 | Scheibenreif | ............... 439/13 |
| 6,276,655 B1 | * | 8/2001 | Byoun | ........................ 361/679 |
| 6,315,259 B1 | * | 11/2001 | Kolb | ....................... 248/276.1 |
| 6,330,993 B1 | * | 12/2001 | Cho | ........................... 248/371 |
| 6,378,830 B1 | * | 4/2002 | Lu | .......................... 248/278.1 |

* cited by examiner

Primary Examiner—Ramon O Ramirez
(74) Attorney, Agent, or Firm—Thomas, Kayden, Horstemeyer & Risley

(57) ABSTRACT

A liquid crystal display and its rotary assembly. The liquid crystal display comprises a displayer, a hinge, a first rotating member, a base, and a second rotating member. The hinge is connected to the displayer, and is disposed on the first rotating member. The first rotating member is disposed on the base. The second rotating member is disposed in the base in a manner such that the second rotating member and the first rotating member rotate together.

24 Claims, 6 Drawing Sheets

LIQUID CRYSTAL DISPLAY AND ITS ROTARY ASSEMBLY

BACKGROUND OF THE INVENTION

1. Field of the Invention

The invention relates to a liquid crystal display; in particular, a liquid crystal display with a simplified and miniaturized rotary assembly.

2. Description of the Related Art

As liquid crystal displays have recently been improved in low-voltage operation, low power consumption, and thickness, the displays are widely used as AV devices, OA devices, or household appliances as well as television receivers or monitors.

FIG. 1a and FIG. 1b show a conventional liquid crystal display 10. The liquid crystal display 10 comprises a displayer 11, a base 14, a support 15, and a rotary shaft 16.

The displayer 11 comprises a liquid crystal panel 111, a front bezel 112, and a rear frame 113. The rear frame 113 is connected to the support 15 via the rotary shaft 16. The support 15 is disposed on the base 14 in a rotatable manner.

As stated above, the displayer 11 is connected to the base 14 via the rotary shaft 16 and the support 15. Thus, the displayer 11 can rotate around an X axis and a Y axis as shown in FIG. 1a. However, the structure of the base 14, the support 15, and the rotary shaft 16 is complicated, and the assembly between these elements is also complicated. Thus, the manufactory process of the conventional liquid crystal display 10 is very complicated.

SUMMARY OF THE INVENTION

In order to address the disadvantages of the aforementioned liquid crystal display, the invention provides a liquid crystal display with a simplified and miniaturized rotary assembly to simplify the manufactory process.

Another purpose of this invention is to provide a rotary assembly adapted for a liquid crystal display at a low cost.

Accordingly, the invention provides a liquid crystal display. The liquid crystal display comprises a displayer, a no hinge, a first rotating member, a base, and a second rotating member. The hinge is connected to the displayer, and disposed on the first rotating member. The first rotating member is disposed on the base. The second rotating member is disposed on the base in a manner such that the second rotating member and the first rotating member rotate together.

In a preferred embodiment, the base includes a first concave portion for receiving the first rotating member.

Furthermore, the first rotating member includes a step portion located in the first concave portion, and the base includes a second concave portion for receiving the second rotating member, opposite to the first concave portion.

In another preferred embodiment, the second rotating member includes a cambered surface abutting on the base to linearly contacting with the base.

In another preferred embodiment, the liquid crystal display further comprises a bolt for connecting the first rotating member and the second rotating member so that the second rotating member and the first rotating member rotate together.

Furthermore, the base includes a hollow portion, the first rotating member includes a screw hole, and the second rotating member includes a through hole corresponding to the screw hole, whereby the bolt is screwed to the screw hole through the through hole to combine the first rotating member and the second rotating member.

In another preferred embodiment, the base, the first rotating member, and the second rotating member are made of metal respectively.

In another preferred embodiment, this invention provides a rotary unit for a liquid crystal display, including a displayer and a hinge. The rotary unit comprises a base, a first rotating member, and a second rotating member. The first rotating member disposed in the base in a rotatable manner is connected to the displayer via the hinge. The second rotating member is disposed in the base in a manner such that the second rotating member and the first rotating member rotate together.

In another preferred embodiment, this invention provides a rotary assembly. The rotary assembly comprises a base, a first rotating member, a second rotating member, and a hinge. The first rotating member is disposed in the base in a rotatable manner. The second rotating member is disposed in the base in a manner such that the second rotating member and the first rotating member rotate together. The hinge is disposed on the first rotating member.

BRIEF DESCRIPTION OF THE DRAWINGS

The invention is hereinafter described in detail with reference to the accompanying drawings in which:

FIG. 2c is a schematic view showing the assembled rotary assembly in FIG. 2a;

FIG. 3a is a schematic view showing a base in FIG. 2a;

FIG. 3b is schematic view showing a first rotating member in FIG. 2a;

FIG. 3c is schematic view showing a second rotating member in FIG. 2a;

DETAILED DESCRIPTION OF THE INVENTION

Figure 1A:
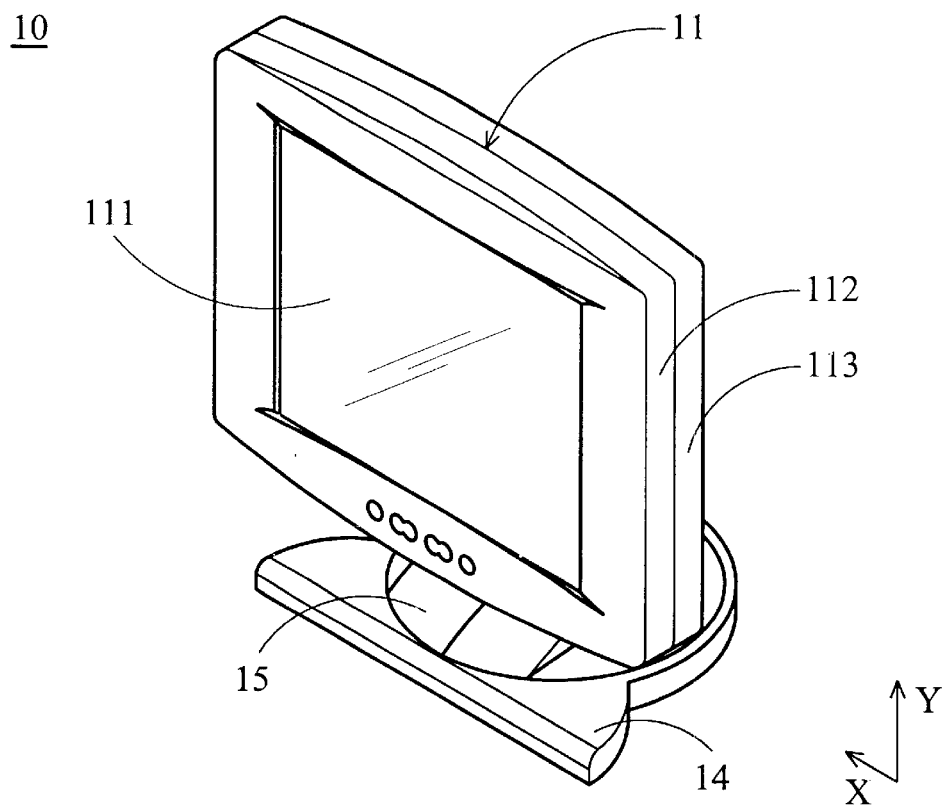
FIG. 1a and FIG. 1b are schematic views of a conventional liquid crystal display.
Figure 1B:
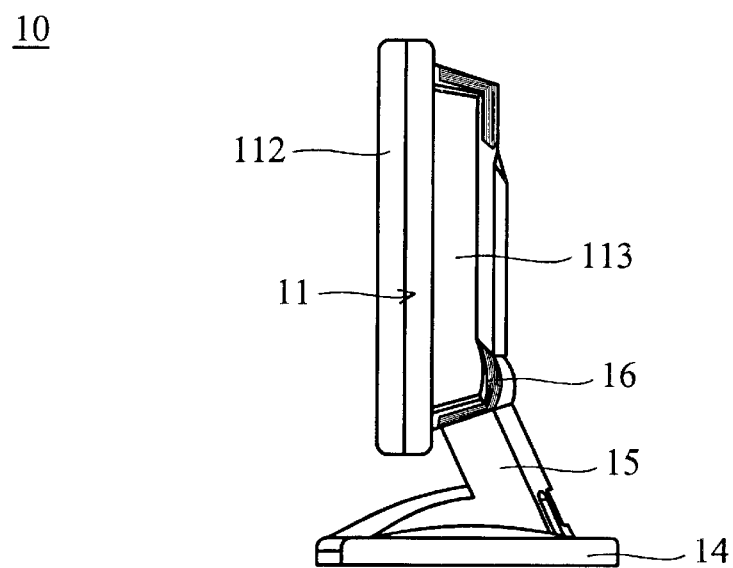
Figure 2A:
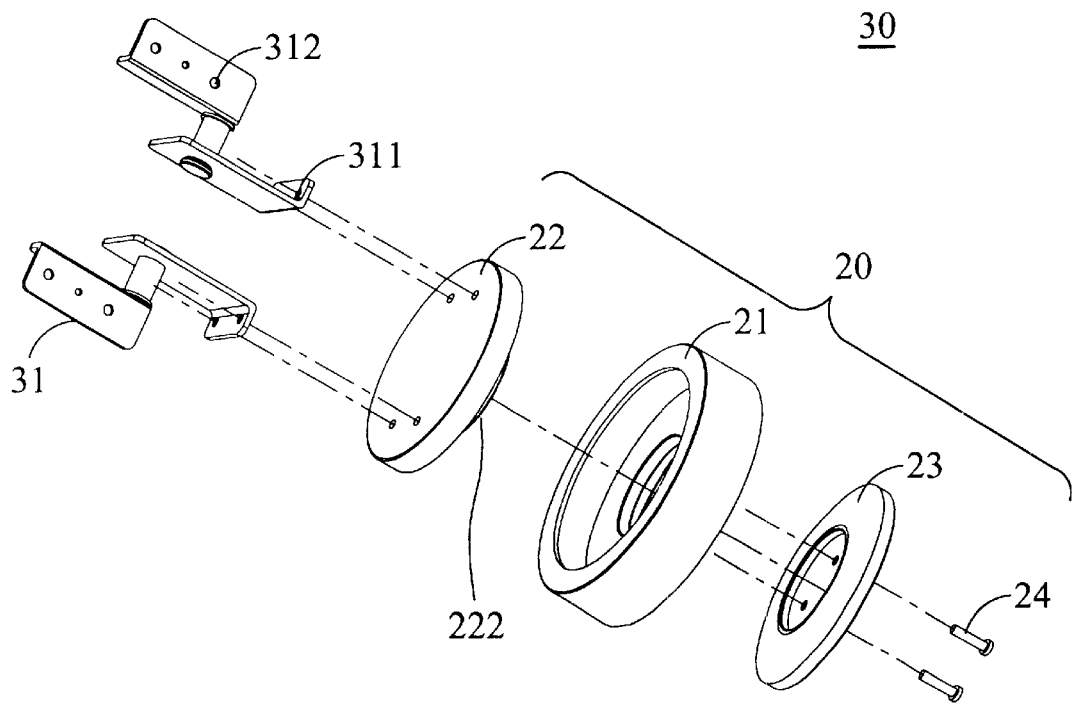
FIG. 2a is an exploded view showing a rotary assembly as disclosed in this invention.
Figure 2B:
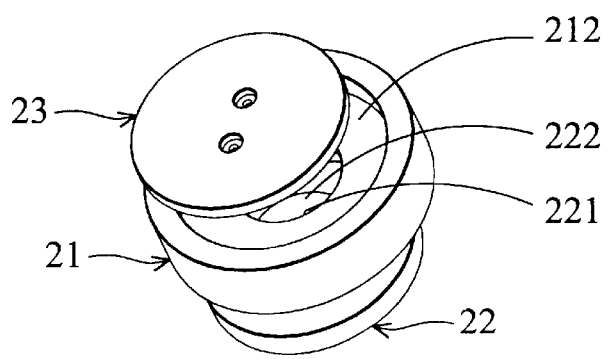
FIG. 2b is an exploded view showing a rotary unit as disclosed in this invention.
Figure 2C:
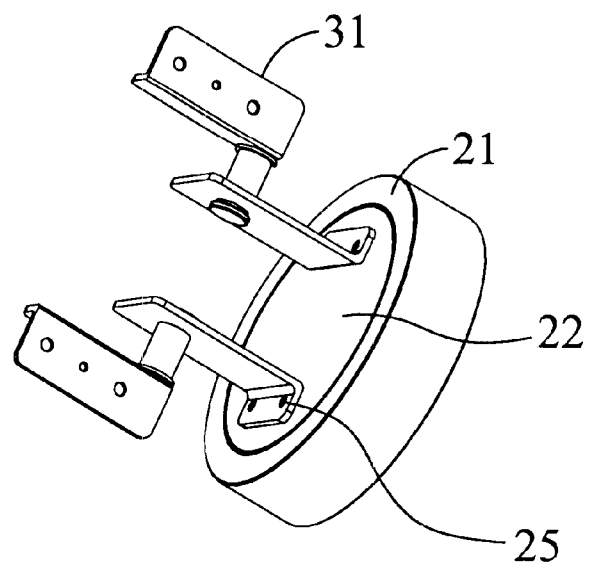

Referring to FIG. 2a and FIG. 2c, a rotary assembly 30, as disclosed in this invention, comprises a base 21, a first rotating member 22, a second rotating member 23, two bolts 24, and a hinge 31. The base 21, the first rotating member 22, the second rotating member 23, and the bolts 24 constitute a rotary unit 20 of this invention, as shown in FIG. 2b.

Figure 3A:
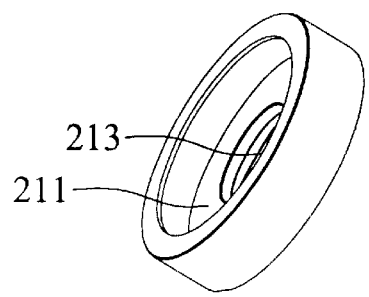

Referring to FIG. 3a, the base 21 includes a first concave portion 211, a second concave portion 212 (referring to FIG. 2b), and a hollow portion 213. The first concave portion 211 receives the first rotating member 22. The second concave portion 212 receives the second rotating member 23 as shown in FIG. 2b. The bolts 24 pass through the hollow portion 213. It is noted that the first concave portion 211 and the second concave portion 212 are formed at opposite sides of the base 21.

Figure 3B:
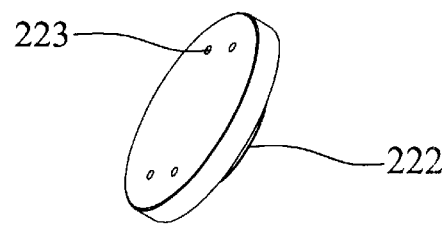

As shown in FIG. 3b, the first rotating member 22 includes a step portion 222. The first rotating member 22 is disposed in the base 21 in a manner such that the step portion 222 is located in the first concave portion 211. Also, the first rotating member 22 is disposed in the base 21 in a rotatable manner. Referring to FIG. 2b, the step portion 222 is provided with two first screw holes 221 at a surface facing the base 21. The first screw holes 221 accept the bolts 24. It is noted that only one first screw hole 221 is shown in FIG. 2b. The first rotating member 22 is provided with a plurality of second screw holes 223 at a surface opposite to the step portion 222.

The hinge 31 may be selected from various types that are commercially available, and is disposed on the first rotating member 22. The hinge 31 is provided with a plurality of second through holes 311 and a plurality of third through holes 312. Referring to FIG. 2c, bolts 25 screw to the second screw holes 223 of the first rotating member 22 through the second through holes 311 of the hinge 31 so that the hinge 31 is disposed on the first rotating member 22.

Figure 3C:
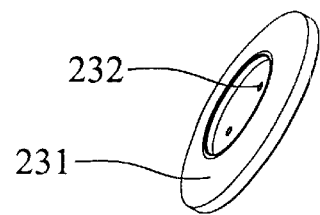

Referring to FIG. 2b, the second rotating member 23 is disposed in the second concave portion 212 of the base 21. As shown in FIG. 3c, the second rotating member 23 includes a cambered surface 231 abutting on the base 21. By means of the cambered surface 231, the second rotating member 23 linearly contacts with the base 21. Thus, the second rotating member 23 rotates smoothly relative to the base 21. In addition, the second rotating member 23 is provided with two first through holes 232 corresponding to the first screw holes 221 of the first rotating member 22.

The bolts 24 are screwed to the first screw holes 221 of the first rotating member 22 through the first through holes 232 of the second rotating member 23 and the hollow portion 213 of the base 21 so that the second rotating member 23 is combined with the first rotating member 22 in a manner such that the second rotating member 23 and the first rotating member 22 rotate together.

It is noted that in this embodiment, the first rotating member 22 and the second rotating member 23 are combined together by the bolts, and the hinge 31 and the first rotating member 22 are combined together by the bolts. However, their combination manner is not limited. For example, they can be combined together by welding.

Furthermore, the base 21 is round in this embodiment; however, its shape is not limited. Based on variant conditions, the base 21' can be rectangular as shown in FIG. 4b. It is understood that the first concave portion and the second concave portion of the base 21' are still round to correspond to the first rotating member and the second rotating member.

In addition, the amount of the bolts, the screw holes, and the through holes is not limited as long as its function can be attained.

Figure 4A:
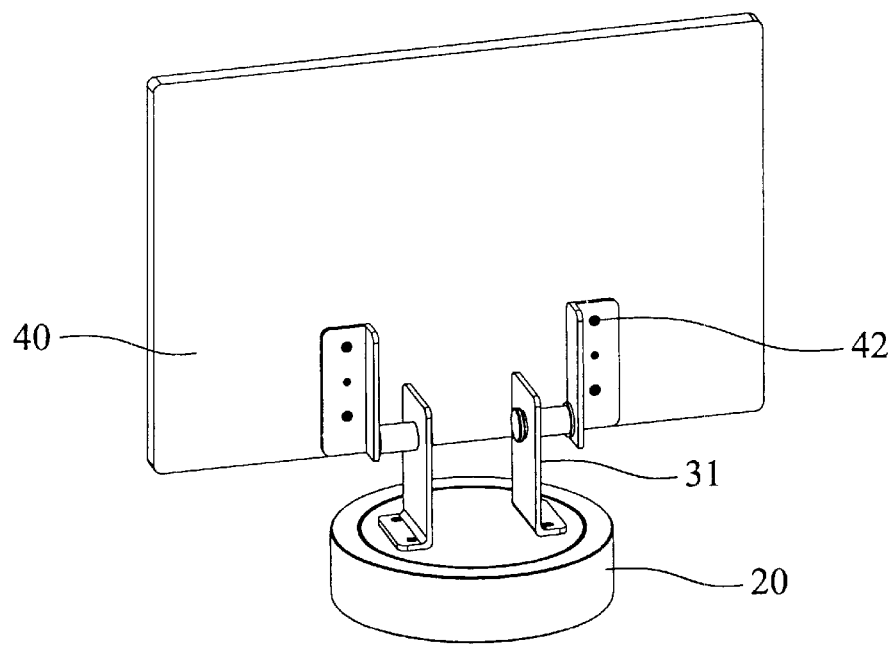
FIG. 4a is a schematic view showing a liquid crystal display as disclosed in this invention.
Figure 4B:
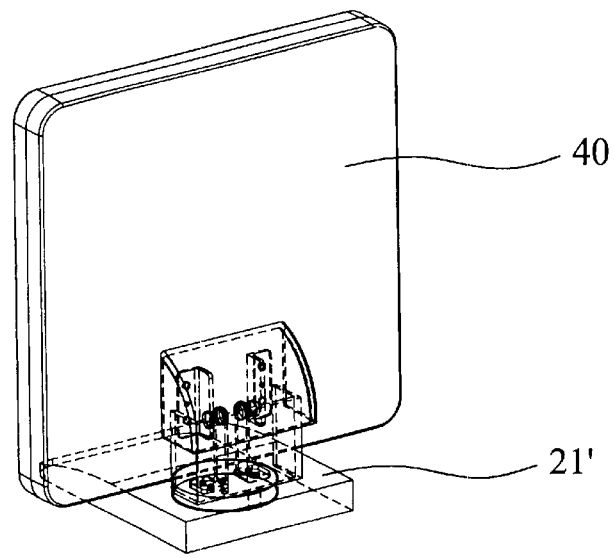
FIG. 4b is a schematic view showing a liquid crystal display as disclosed in this invention, with a second embodiment of a rotary assembly.

Referring to FIG. 4a, a liquid crystal display 100, as disclosed in this invention, comprises a displayer 40 and the rotary assembly 30 as stated above.

The displayer 40 is connected to the rotary assembly 30 via the hinge 31. Bolts 42 are screwed to the screw holes (not shown) of the displayer 40 through the third through holes 312 (referring to FIG. 2a) of the hinge 31 so that the hinge 31 is connected to the displayer 40. However, its connection manner is also not limited.

Since the rotary assembly 30 supports the displayer 40's weight, it must itself have a certain weight to prevent imbalance. Thus, the base 21, the first rotating member 22, and the second rotating member 23 may be made of a material with larger specific gravity, such as metal. As a result, the displayer 40 can be stably disposed on the rotary unit 20.

Figure 5:
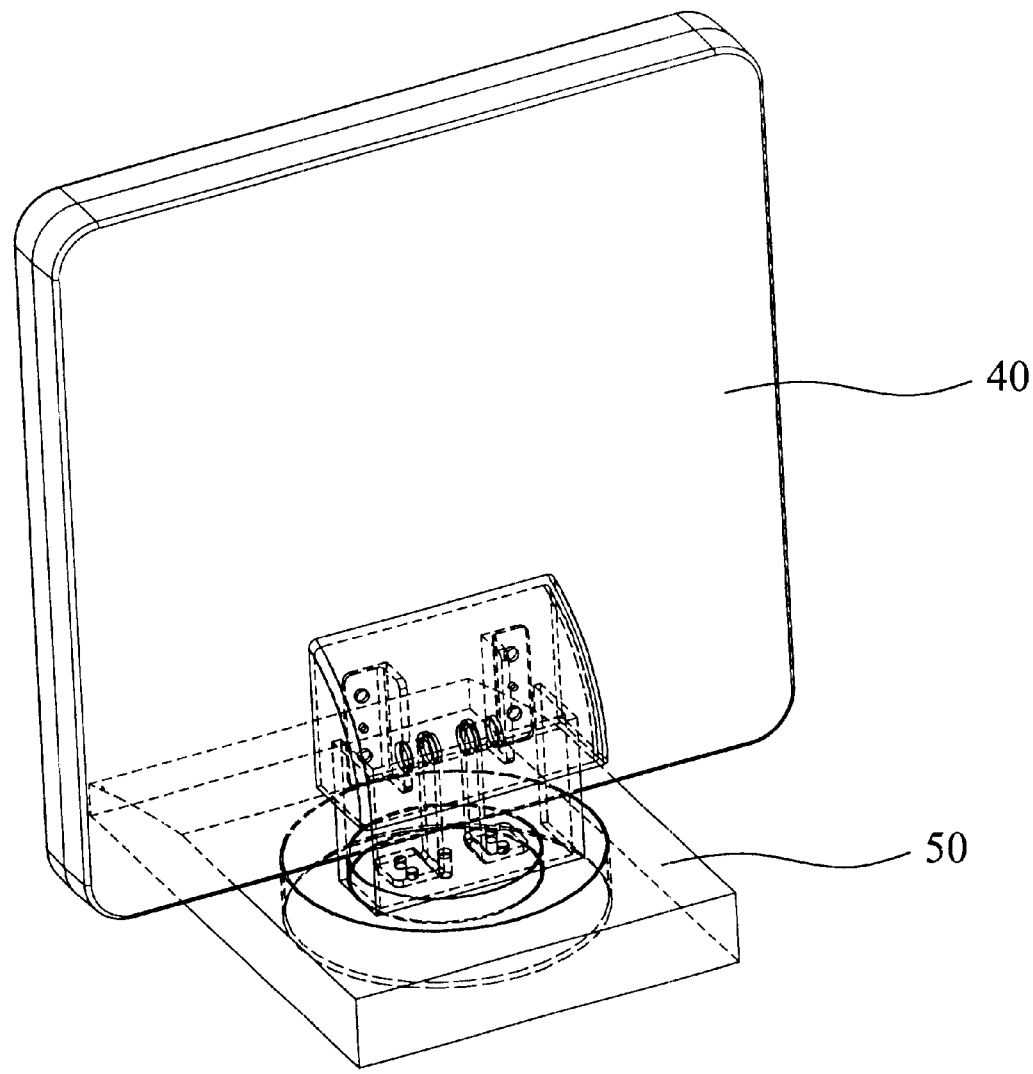
FIG. 5 is a schematic view showing a liquid crystal display as disclosed in this invention, with a third embodiment of a rotary assembly.

In addition, the rotary unit 20 can be disposed in another, commercially available, base. For example, as shown in FIG. 5, the rotary unit 20 may be directly disposed in a rectangular base 50.

As stated above, when the displayer is assembled to the rotary assembly as disclosed in this invention, assembly is convenient and quick. Furthermore, since the rotary assembly is metal, it can stably support the displayer. Also, the liquid crystal display can be miniaturized to reduce volume. In addition, since the rotary assembly can be combined with the commercially available base, it can be simplified at a low cost.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. A rotary assembly comprising:

a base;

a first rotating member disposed on the base in a rotatable manner;

a second rotating member disposed on the base in a manner such that the second rotating member and the first rotating member rotate together; and a hinge disposed on the first rotating member.

2. The rotary assembly as claimed in claim 1, wherein the base includes a first concave portion for receiving the first rotating member.

3. The rotary assembly as claimed in claim 2, wherein the first rotating member includes a step portion located in the first concave portion.

4. The rotary assembly as claimed in claim 2, wherein the base includes a second concave portion for receiving the second rotating member, opposite to the first concave portion.

5. The rotary assembly as claimed in claim 1, wherein the second rotating member includes a cambered surface abutting on the base to linearly contacting with the base.

6. The rotary assembly as claimed in claim 1, further comprising:

a bolt for connecting the first rotating member and the second rotating member so that the second rotating member and the first rotating member rotate together.

7. The rotary assembly as claimed in claim 6, wherein the base includes a hollow portion, the first rotating member includes a screw-hole, and the second rotating member includes a through hole corresponding to the screw hole, whereby the bolt is screwed to the screw hole through the through hole to combine the first rotating member and the second rotating member.

8. The rotary assembly as claimed in claim 1, wherein the base, the first rotating member, and the second rotating member are made of metal respectively.

9. A liquid crystal display comprising:

a displayer;

a hinge connected to the displayer;

a first rotating member for the hinge to dispose thereon;

a base for the first rotating member to dispose therein; and a second rotating member disposed in the base in a manner such that the second rotating member and the first rotating member rotate together.

10. The liquid crystal display as claimed in claim 9, wherein the base includes a first concave portion for receiving the first rotating member.

11. The liquid crystal display as claimed in claim 10, wherein the first rotating member includes a step portion located in the first concave portion.

12. The liquid crystal display as claimed in claim 10, wherein the base includes a second concave portion for receiving the second rotating member, opposite to the first concave portion.

13. The liquid crystal display as claimed in claim 9, wherein the second rotating member includes a cambered surface abutting on the base to linearly contacting with the base.

14. The liquid crystal display as claimed in claim 9, further comprising:

a bolt for connecting the first rotating member and the second rotating member so that the second rotating member and the first rotating member rotate together.

15. The liquid crystal display as claimed in claim 14, wherein the base includes a hollow portion, the first rotating member includes a screw hole, and the second rotating member includes a through hole corresponding to the screw hole, whereby the bolt is screwed to the screw hole through the through hole to combine the first rotating member and the second rotating member.

16. The liquid crystal display as claimed in claim 9, wherein the base, the first rotating member, and the second rotating member are made of metal respectively.

17. A rotary unit for a liquid crystal display having a displayer and a hinge, comprising:

a base;

a first rotating member disposed in the base in a rotatable manner, connected to the displayer via the hinge; and a second rotating member disposed in the base in a manner such that the second rotating member and the first rotating member rotate together.

18. The rotary unit as claimed in claim 17, wherein the base includes a first concave portion for receiving the first rotating member.

19. The rotary unit as claimed in claim 18, wherein the first rotating member includes a step portion located in the first concave portion.

20. The rotary unit as claimed in claim 18, wherein the base includes a second concave portion for receiving the second rotating member, opposite to the first concave portion.

21. The rotary unit as claimed in claim 17, wherein the second rotating member includes a cambered surface abutting on the base to linearly contacting with the base.

22. The rotary unit as claimed in claim 17, further comprising:

a bolt for connecting the first rotating member and the second rotating member so that the second rotating member and the first rotating member rotate together.

23. The rotary unit as claimed in claim 22, wherein the base includes a hollow portion, the first rotating member includes a screw hole, and the second rotating member includes a through hole corresponding to the screw hole, whereby the bolt is screwed to the screw hole through the through hole to combine the first rotating member and the second rotating member.

24. The rotary unit as claimed in claim 17, wherein the base, the first rotating member, and the second rotating member are made of metal respectively.

* * * * *